United States Patent [19]

Abbate

[11] 4,123,969
[45] Nov. 7, 1978

[54] YEAST RAISING BAKING APPLIANCE

[76] Inventor: Warren J. Abbate, 813 Westacres, Pueblo, Colo. 81005

[21] Appl. No.: 863,785

[22] Filed: Dec. 23, 1977

[51] Int. Cl.² .......................... A01J 11/04; A23C 3/02
[52] U.S. Cl. ..................................... 99/467; 126/348; 219/401
[58] Field of Search .................................. 99/467–476, 99/483, 402; 219/401, 232, 272; 126/348, 369

[56] References Cited
U.S. PATENT DOCUMENTS

| | | | |
|---|---|---|---|
| 2,499,525 | 3/1950 | Person | 219/362 |
| 3,456,598 | 7/1969 | MacKay | 99/483 |
| 3,518,949 | 7/1970 | Stock | 99/483 |
| 3,949,733 | 4/1976 | Miller et al. | 126/348 |
| 4,011,805 | 3/1977 | Vegh et al. | 99/467 |

Primary Examiner—Leonard D. Christian

Attorney, Agent, or Firm—Daniel Jay Tick

[57] ABSTRACT

Electric heating elements are provided on thermal insulation at the bottom of a housing. A flat pan type water container has a bottom resting on the electric heating elements and a top in spaced parallel relation with the bottom and has perforations formed through the top for releasing steam produced by heating water in the container. A plurality of U-shaped support members are removably mounted in the housing in spaced parallel relation extending perpendicularly from the bottom of the housing and extending beyond the housing. Each of the support members has pan supporting devices for supporting a plurality of baking pans within the support members in spaced parallel relation with the bottom of the housing. A cover of transparent material is provided over the support members.

1 Claim, 4 Drawing Figures

THERMOSTAT AND ON OFF SWITCH

WATER CONTAINER 6

ELECTRIC HEATING ELEMENTS 5

THERMOSTAT AND ON OFF SWITCH

ELECTRIC HEATING ELEMENT 5

WATER CONTAINER 6

ELECTRIC HEATING ELEMENTS 5

THERMAL INSULATION 4

YEAST RAISING BAKING APPLIANCE

BACKGROUND OF THE INVENTION

The present invention relates to a yeast raising baking appliance.

Baking appliances similar in purpose to the yeast raising baking appliance described herein are disclosed in the following United States patents. U.S. Pat. No. 1,162,897, issued Dec. 7, 1915 to Ames, U.S. Pat. No. 1,534,835, issued Apr. 21, 1925 to Bozie, U.S. Pat. No. 1,816,908, issued Aug. 4, 1931 to Kuntz, U.S. Pat. No. 2,499,525, issued Mar. 7, 1950 to Person, U.S. Pat. No. 2,659,295, issued Nov. 17, 1953 to Soccoli, U.S. Pat. No. 3,418,453, issued Dec. 24, 1968 to Sparks, U.S. Pat. No. 3,456,598, issued July 22, 1969 to MacKay, U.S. Pat. No. 3,808,825, issued May 7, 1974 to Ciurea, U.S. Pat. No. 3,814,900, issued June 4, 1974 to Frey et al, U.S. Pat. No. 3,910,177, issued Oct. 7, 1975 to Wakeman, U.S. Pat. No. 3,916,872, issued Nov. 4, 1975 to Kreis et al and U.S. Pat. No. 4,010,349, issued Mar. 1, 1977 to Lee.

Objects of the invention are to provide a yeast raising baking appliance of simple structure, which is inexpensive in manufacture, and functions efficiently, effectively and reliably to cause yeast raised dough to rise more quickly and uniformly than in known appliances.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
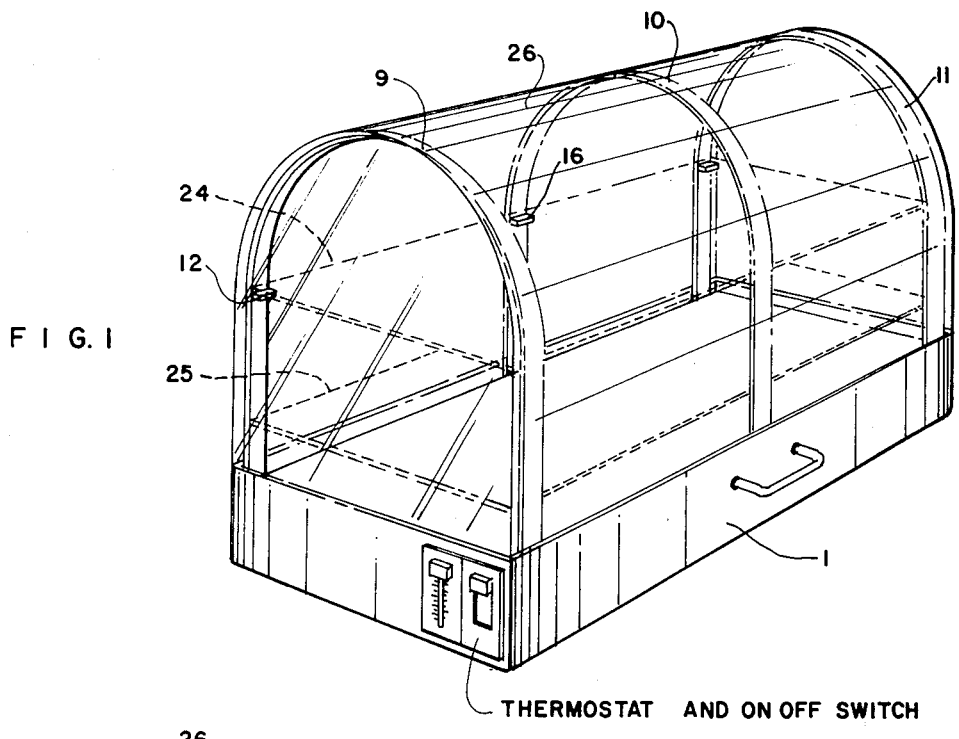
FIG. 1 is a perspective view of an embodiment of the yeast raising baking appliance of the invention.
Figure 2:
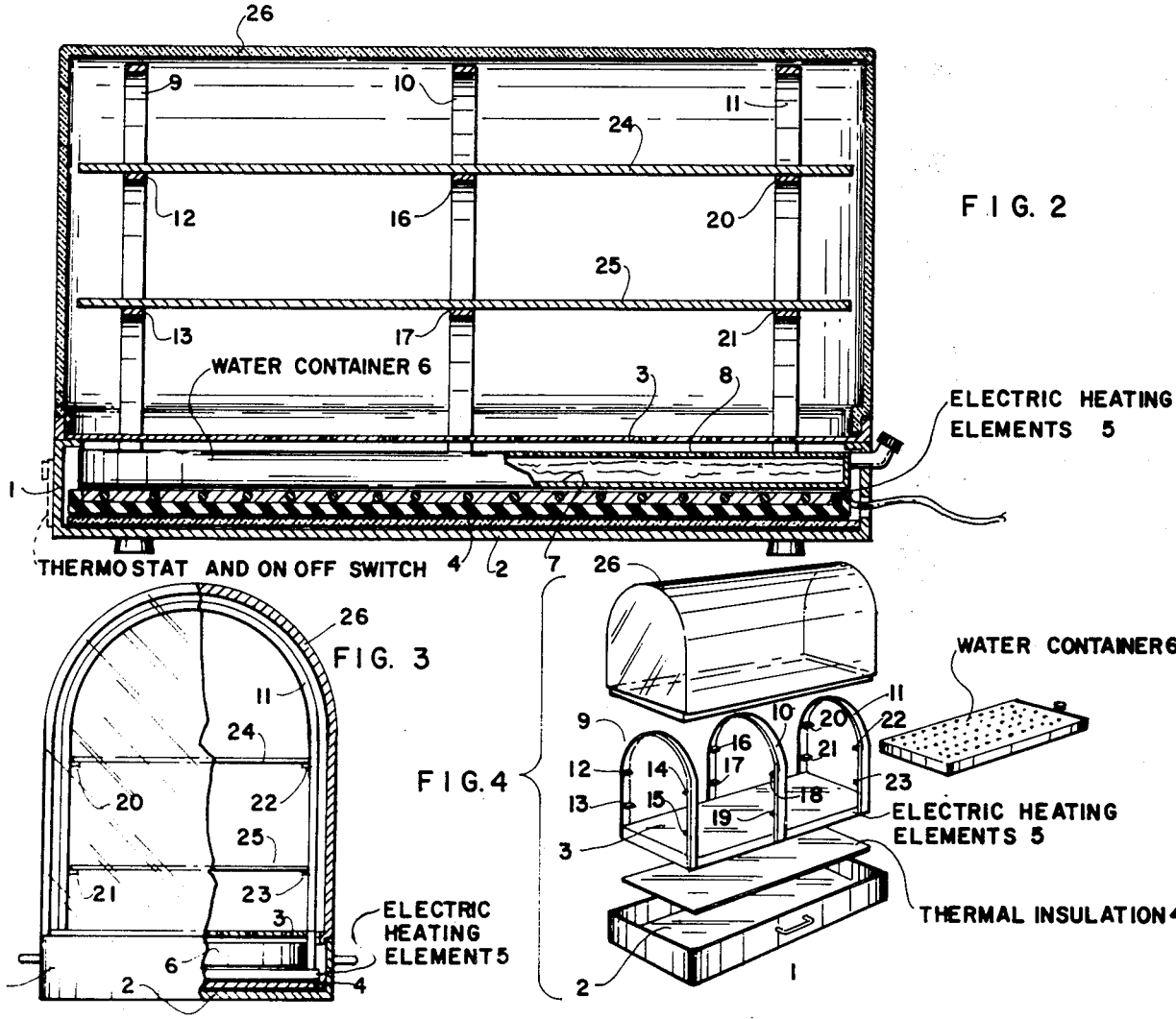
FIG. 2 is a sectional view, on an enlarged scale, with the water container partly cutaway and partly in section, of the yeast raising baking appliance of the invention.
Figure 3:
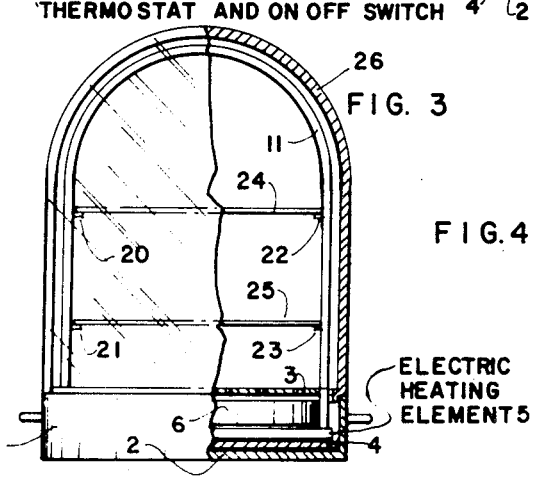
FIG. 3 is an end view, partly cutaway and partly in section, of the embodiment of FIG. 2.
Figure 4:
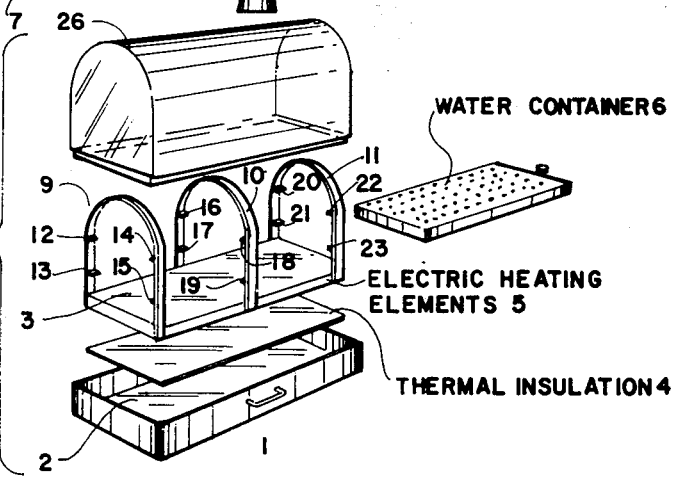
FIG. 4 is an exploded perspective view, on a reduced scale, of the embodiment of FIG. 2.

The yeast raising baking appliance of the invention comprises a housing 1 (FIGS. 1 to 4) having a bottom 2 (FIGS. 2 to 4) and a top 3 (FIGS. 2 to 4). The housing 1 is essentially a pan. The top 3 is perforated, as shown in FIGS. 2 and 3 and is actually a support plate which is positioned as the top of the housing when the appliance is assembled, as hereinafter described.

Thermal insulation 4 (FIGS. 2 to 4) is provided in the housing 1 at the bottom thereof. The thermal insulation 4 is preferably a pad of thermal insulation.

Electric heating elements 5 are provided in the housing 1 on the thermal insulation 4, as shown in FIGS. 2 to 4. A flat pan type water container 6 (FIGS. 2 to 4) has a bottom 7 (FIG. 2) resting on the electric heating elements 5 and a top 8 (FIG. 2) in spaced relation with the bottom and having perforations formed therethrough, as shown in FIGS. 2 and 4, for releasing steam produced by heating of water in said container.

A plurality of substantially U-shaped support members 9, 10 and 11 (FIGS. 1, 2 and 4) are removably mounted in the housing 1 in spaced substantially parallel relation extending substantially perpendicularly from the bottom of said housing and extending beyond said housing, as shown in the FIGS. This is accomplished by mounting the U-shaped support members 9, 10 and 11 on a support plate which serves as the top 3 of the housing 1 when the appliance is assembled.

Each of the support members 9, 10 and 11 has pan supporting pins, projections or grooves for supporting a plurality of baking pans within said support members in spaced substantially parallel relation with the bottom 2 of the housing 1. As shown in FIG. 4, the pan supporting devices illustrated in the FIGS. comprise projections 12, 13, 14 and 15 extending from the support member 9, projections 16, 17, 18 and 19 extending from the support member 10, and projections 20, 21, 22 and 23 extending from the support member 11. These projections support removable racks 24 and 25 on which baking pans are placed in the aforedescribed manner (FIGS. 1 to 3).

A cover 26 of transparent material of any suitable type such as, for example, plastic (FIGS. 1 to 4) is provided over the support members 9, 10 and 11 to provide a substantially moisture-tight enclosure over the housing 1.

While the invention has been described by means of a specific example and in a specific embodiment, I do not wish to be limited thereto, for obvious modifications will occur to those skilled in the art without departing from the spirit and scope of the invention.

I claim:

1. A yeast raising baking appliance, comprising
a housing having a bottom and a top;
thermal insulation in the housing at the bottom thereof;
electric heating means in the housing on the thermal insulation;
a flat pan type water container having a bottom resting on the electric heating means and a top in spaced parallel relation with the bottom and having perforations formed therethrough for releasing steam produced by heating of water in said container;
a plurality of substantially U-shaped support members removably mounted in the housing in spaced substantially parallel relation extending substantially perpendicularly from the bottom of said housing and extending beyond said housing, each of said support members having pan supporting means for supporting a plurality of baking pans within said support members in spaced substantially parallel relation with the bottom of the housing; and
a cover of transparent material over the support members.

* * * * *